United States Patent [19]

Tanzi et al.

[11] Patent Number: 5,571,890
[45] Date of Patent: Nov. 5, 1996

[54] POLYETHERAMIDOAMINE SUPERABSORBENT HYDROGELS

[75] Inventors: Maria C. Tanzi, Milan; Gianfranco Palumbo; Giovanni Carlucci, both of Pescara, all of Italy

[73] Assignee: Societa Consortile Ricerche Angelini S.p.A., Pescara, Italy

[21] Appl. No.: 331,511

[22] PCT Filed: Apr. 16, 1993

[86] PCT No.: PCT/EP93/00919

§ 371 Date: Nov. 22, 1994

§ 102(e) Date: Nov. 22, 1994

[87] PCT Pub. No.: WO93/21256

PCT Pub. Date: Oct. 28, 1993

[30] Foreign Application Priority Data

Apr. 21, 1992 [IT] Italy ................... MI92A0956

[51] Int. Cl.⁶ .................. C08G 73/02; A61L 15/00; A61L 13/00
[52] U.S. Cl. .................. 528/342; 528/170; 528/176; 528/183; 528/192; 528/194; 528/220; 528/223; 528/224; 528/228; 528/229; 528/310; 528/322; 528/345; 604/368
[58] Field of Search .................. 528/170, 176, 528/183, 192, 194, 220, 223, 224, 228, 229, 310, 322, 342, 345; 600/56

[56] References Cited

FOREIGN PATENT DOCUMENTS

9321257A1  10/1993  European Pat. Off. .
3721057    1/1989   Germany .

OTHER PUBLICATIONS

Journal of Applied Science, vol. 28, 1983, pp. 3361–3368, Pesavento, et al, "Applied Macroinorganics. IV. Effects of the Crosslinking Agent on Protonation, and Metal Ions Complexing Abilities, of Ion Exchange Resins with Poly(amido–Amine) Structure".

Biomaterials, vol. 5, Nov. 1984, pp. 357–361, Tanzi, et al, "Synthesis and characterization of poly(amido–amines)s belonging to two different homologous series".

Chemical Abstracts, vol. 106, No. 26, 29 Jun. 1987, Abstract No. 214758j, Kopylova, et al, "Structure and properties of cross–linked hydrogels based on a poly(acrylic acid)–polyethyleneimine polyelectrolyte complex", p. 26, column 2.

Chemical Abstracts, vol. 114, No. 14, 8 Apr. 1991, Abstract No. 123814y, Penczek, et al, "Preparation of cross–linked hydrogels", p. 51, column 1.

Primary Examiner—James J. Seidleck
Assistant Examiner—P. Hampton-Hightower
Attorney, Agent, or Firm—Griffin, Butler, Whisenhunt & Kurtossy

[57] ABSTRACT

Polyetheramidoamine hydrogels consisting of polyetheramidoamine and/or polyamidoamine prepolymers crosslinked by Michael's nuceophilic polyaddition with alpha-omega-diamino monomers or with alpha-omega-diamino monomers or oligomers; said hydrogels having a swelling degree in water higher than 500% and are useful as superabsorbent materials.

9 Claims, No Drawings

POLYETHERAMIDOAMINE SUPERABSORBENT HYDROGELS

The present invention relates to polyetheramidoamine hydrogels, to processes for the preparation thereof and to the use thereof as superabsorbent materials.

The commonly so called superabsorbent materials are hydrophilic polymers, having different chemical structure, which are capable of absorbing and retaining aqueous fluids even under moderate pressure in amounts equals to many time their own weight, without substantially dissolving into the liquid itself.

Superabsorption characteristics are given by the presence, in the fundamental structure, of ionizable groups, which are generally of the anionic type (carboxylates) and are partially or totally salified; when in contact with water, said groups dissociate and solvatate.

When dissociated, the functional groups along the polymeric chain have the same electric charge, therefore repel each other.

This fact causes a widening of the polymeric lattice, therefore a further absorption of water molecules is possible.

Generally, in order to avoid that such a process may lead to the dissolution of the polymer, this last is crosslinked by means of suitable agents as to make the gel substantially insoluble.

Accordingly, the absorption of water allows a substantial swelling of the polymer only.

Liquid absorption from polyelectrolytic superabsorbents is strongly adversed by the concentration of dissolved electrolytic salts.

In fact, the ions, coming from the dissociation of the salts, interact with the global charge of the macroion of the polymer, thus reducing the repelling potential between its functional groups, consequently also the absorbing capacity will decrease.

As a consequence, the absorbing capacity drastically decreases passing from deionized water to saline aqueous solutions.

To date all the commercially available superabsorbent materials, such as for example polyacrylates, CMC, etc, show such a sensitivity to saline concentration (K. Nukushina; Chem. Abs. 94:66783 e).

Moreover, the gels of said superabsorbent polymers show the highest absorbing capacity when the pH of the aqueous solutions, which they are contacted with, is between 8 and 10.

Said absorbing capacity is strongly reduced in the pH range lower than 5, as it can be seen from Table A ("Absorbency" by Pronoy Chatterjee, 1985, pag. 206).

TABLE A

Effect of pH on the absorbing capacity of sodium polyacrylate.

| pH | Free swelling capacity (g H$_2$O/g) |
|----|------------------------------------|
| 12 | 85 |
| 7  | 90 |
| 5  | 60 |
| 3  | <10 |

The superabsorbing materials presently known belong to two main classes:

a) natural polymer derivatives containing anionic functional groups, such as carboxymethylcellulose, acrylonitrile grafted starches, etc;

b) completely synthetic polymers, such as polyacrylates, polyvinylalcohols, polyacrylamides, polyethyleneoxides, etc., which are obtained according to several processes, such as for example reverse phase polymerization, radiation-induced polymerization, etc..

Superabsorbent materials are applied in several industrial fields: their use has been proposed in agriculture as sowing adjuvant, in building, in alkaline batteries manufacturing, in filter media manufacturing.

However, their main use, in association with cellulose fibers, is in the field of the hygienic and sanitary products, as highly absorbing material, used in lady's napkins, diapers for infants and incontinent adults.

It has now been found that crosslinked polyetheramidoamine polymers, obtained from primary or secondary diamines and containing ether and bisacrylamido groups, can gelify when absorbing aqueous liquids in amounts which are many times their own weight, thus showing superabsorbency characteristics.

U.S. Pat. No. 3,865,723 discloses both linear and crosslinked polyamidoamine derivatives as heparin complexing agents useful in the biomedical field.

Polymers consisting of structures derived from primary amines or di-secondary amines and bisacrylamides, both linear and crosslinked, by means of primary diamine, are described by Ferruti and Barbucci, Adv. in Polym. Sci. 58, p.55-92, Springer Verlag, 1984, wherein their use in the biomedical field is provided.

In the hydrogels according to the invention the presence of polyether chains advantageously enhances the hydrophilicity of the system. In fact, it seems that crosslinked polyamidoamine structures are not able to absorb high amounts of water (Pesavento e al., J. Appl. Polym. Sci., 28, 3361-68 (1983)).

Polyetheramidoamines of the invention are obtained according to a process comprising the nucleophilic polyaddition of diamine monomers to compounds bearing activated double bonds (Michael's type addition).

The addition reaction of an amino group to a double bond, which is activated by the presence of an adjacent carboxyl group, by means of hydrogen transfer (Michael's type) is described in DE 250214 and U.S. Pat. No. 3,445,441 wherein a similar mechanism is used to obtain polyelectrolytic flocculants.

Hydrogels of the invention are formed by polymeric polyetheramidoamine and/or polyamidoamine chains ending with acryl groups, hereinafter named as "prepolymers" in their turn crosslinked with suitable crosslinking agents.

The prepolymers are obtained by a Michael's type nucleophilic polyaddition, starting from bisacrylamido bifunctional monomers named [AA], of formula (I),

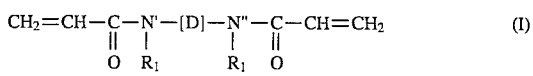
(I)

wherein:

$R_1$ is hydrogen;

[D] is $C_1$–$C_{12}$ straight or branched alkylene unsubstituted or substituted with one or more hydroxy groups, optionally interrupted by oxygen atoms, or [D], together with N' and N", forms a piperazine ring, in which case $R_1$ is absent;

which are reacted with alpha-omega-diamino bifunctional monomers, named [BB], of formula (II):

(II)

wherein:

$R_2$ is $C_1$–$C_{10}$ straight or branched alkyl, optionally substituted with one or more hydroxy groups;

[E] is $C_1$–$C_{12}$ straight or branched alkylene unsubstituted or substituted with one or more hydroxy groups, optionally interrupted by oxygen atoms; or the monomers [AA] are reacted with monofunctional monomers, named [B], of formula (IIa):

$$H_2N\text{—}[F]\text{—}H \qquad (IIa)$$

wherein [F] has the same meanings as [E] and can also be interrupted by tertiary amino groups. Preferred alkylene groups [D] are included in the following formula (III):

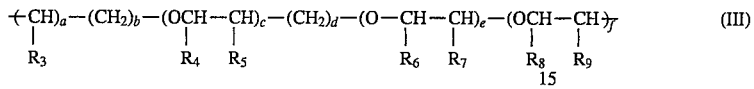

(III)

wherein a, b, c, d, e and f are numbers 0 to 12, $R_3$ is methyl, hydroxy, $C_1$–$C_{12}$ alkyl, optionally substituted with one or more hydroxy groups;

$R_4$–$R_9$ are independently hydrogen or methyl.

Particularly preferred alkylene groups [D] are those which, together with the nitrogen atoms N' and N'', form the polyoxyalkylenediamines known under the commercial name Jeffamine®, manufactured by Texaco Chemical Company.

Even more preferred monomers are monomers [AA], in which [D] is a group of formula (III) wherein $R_3$ is methyl, $R_4$ is hydrogen, $R_5$ is methyl, a and b are 1, c is an integer 2 to 12 included, d, e, f are 0; or:

$R_3$, $R_4$ and $R_9$ are methyl, $R_5$–$R_8$ are hydrogen, a and b are 1, c is about 8.5, d is 0, the sum e+f is about 2.4; or:

a, d, f are 0, b is 2, c and e are 1, $R_4$–$R_7$ are hydrogen. Particularly preferred are bisacryloylpiperazine (BAP), methylene-bis-acrylamide (BAC), dihydroxyethylenebisacrylamide (DHEBA).

Particularly preferred compounds of formula (II) are those in which $R_2$ are both 2-hydroxypropyl, [E] has the following formula:

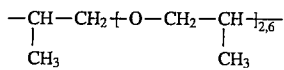

In some particular cases monofunctional monomers (IIa) are used as chain extending agents between two monomers [AA].

The resulting prepolymer has the following formulae:

$$\{[AA]\,[BB]\}_x$$

or $$\{[AA]\,[B]\}_x\,\{[AA]\,[BB]\}_y$$

wherein x and y are numbers 1 to 50.

The cross-linking of the resulting prepolymer takes place through Michael's nucleophilic polyaddition.

For the cross-linking at least tetrafunctional crosslinking agents are used, of formula (IV):

$$H_2N\text{—}[G]\text{—}NH_2 \qquad (IV)$$

wherein:

[G] is $C_2$–$C_{12}$ straight or branched alkylene, unsubstituted or substituted with one or more hydroxy groups, optionally interrupted by oxygen atoms and/or

amino groups, wherein $R_{10}$ is hydrogen or $C_1$–$C_4$ alkyl.

Preferred compounds are those of formula (IV), wherein [G] represents the polyoxyalkylene residues known by the commercial name Jeffamine® of the M, D, ED, C-346, DU, EDR-148 and T series, described in the publication by Texaco Chemical Company "The JEFFAMINE® Polyoxyalkyleneamines", 1987.

Among the crosslinking agents, Jeffamine DU-700 (polyoxyalkylenediamines) is particularly preferred.

The stoichiometric ratio, considered in equivalents, of the monomer [AA] to the sum of the monomer [BB] with the crosslinking agent must be such that the number of acryl bonds on [AA] be the same as the number of the hydrogen atoms bound to the amino nitrogen atoms, i.e., each molecule [AA] corresponds to one molecule [BB] and to half a molecule of the crosslinking agent.

Cross-linking can be carried out according to two different methods.

a) in two steps, first preparing the prepolymer $\{[AA]\,[BB]\}_x$, which, optionally after recovering it, is reacted with the crosslinking agent;

b) in a single step, wherein the monomers and the crosslinking agent/s are reacted simultaneously.

The reaction medium consists of a polar solvent or a mixture of polar solvents, such as water or water-miscible alcohols. The reaction temperature ranges from 0° to 60° C., preferably from 20° to 40° C.

The hydrogel will have different cross-linking degrees, depending on the desired physical characteristics.

The final product will be elastic and have a swelling degree in water at least higher than 500%.

The hydrogels of the present invention show the important advantage to absorb liquids in a way which is practically independent from saline concentration, contrarily to the presently known superabsorbent products, whose absorption capacity is strongly affected by the presence of electrloytes.

The following examples further illustrate the invention.

EXAMPLE 1

JAEJ 10%

7.6 g of BAP (39.18 mmoles), under stirring, in nitrogen atmosphere were added to 6.78 g of JC346 (19.59 mmoles) in 17 ml $H_2O$. The solution was then allowed to react for 2 days at room temperature, without stirring, shielding from the light. Then 0.9 g of Jeffamine D230 (polyoxyalkylenediamines) (3.91 mmoles) and 0.94 g of EDA (ethylenediamine, 15.64 mmoles), previously dissolved in 4 ml of 1:3 MeOH/$H_2O$ mixture were added. Crosslinking reaction was carried out for 3 days at room temperature. After several washings with MeOH (methanol) and drying under vacuum at room temperature a yellow, friable gel was obtained. (62% yield).

EXAMPLE 2

JAJ 25%

6.78 g of BAP (34.9 mmoles), under stirring, in nitrogen atmosphere were added to 6.04 g of JC346 (17.45 mmoles)

in 16 ml H₂O. The solution was then allowed to react for 4 days at room temperature, without stirring, shielding from the light. Then 2.0 g of Jeffamine D230 (polyoxyalkylene-diamines) (8.72 mmoles) and 1 ml of MeOH were added. Cross-linking reaction was carried out for 3 days at room temperature. After several washings with MeOH and drying under vacuum at room temperature a yellow, soft gel was obtained. (50% yield).

EXAMPLE 3

JAEJ 5%

5.97 g of BAP (30.74 mmoles), under stirring, in nitrogen atmosphere were added to 5.32 g of JC346 (15.37 mmoles) in 15 ml H₂O. The solution was then allowed to react for 4 days at room temperature, without stirring, shielding from the light. Then 0.35 g of Jeffamine D230 (polyoxyalkylene-diamines) (1.37 mmoles) and 0.37 g of EDA (ethylenediamine, 6.15 mmoles), and 1 ml of MeOH were added. Crosslinking reaction was carried out for 3 days at room temperature. After several washings with MeOH and drying under vacuum at room temperature a 90% yield was obtained.

EXAMPLE 4

JA'Jed9 bis (FA 62)

3.17 g of BAP (20.62 mmoles) and 4.64 g of Jeffamine ED900 (polyoxyalkylenediamines) (5.15 mmoles) were added to 3.57 g of JC346 (10.31 mmoles) in 22.8 ml H₂O. Cross-linking reaction was carried out for 3 weeks at room temperature. After several washings with MeOH and drying under vacuum at room temperature 80% yield was obtained.

EXAMPLE 5

DAEJ 5%

5.81 g of BAC (29.9 mmoles) in 15 ml H₂O were added to 2.16 g of DMESA (14.9. mmoles). The solution was then allowed to react for 3 days shielding from the light. Then 0.34 g of Jeffamine D230 (polyoxyalkylenediamines) (1.49 mmoles) and 0.35 g of EDA (5.98 mmoles) and 4 ml of MeOH were added. After 1 day a gel was obtained which was washed with MeOH after four days and dried under vacuum at room temperature after 4 days, giving a yellowish, brittle gel (88% yield).

EXAMPLE 6

DA'EJ 5%

4.8 g of BAC (31.2 mmoles), in 15 ml H₂O were added to 2.25 g of DMESA (15.6 mmoles). The solution was then allowed to react for 3 days, shielding from the light. Then 0.36 g of Jeffamine D230 (polyoxyalkylenediamines) (1.55 mmoles) and 0.36 g of EDA (6.23 mmoles) and 1 ml of MeOH were added. After 1 day a gel was obtained, which was washed with MeOH and dried under vacuum at room temperature after 4 days, giving a transparent, brittle gel (85% yield).

EXAMPLE 7

DA'ed9 /edr (FA 55)

1.14 g of BAC (7.44 mmoles) and 55 mg of Jeffamine EDR 148 (polyoxyalkylenediamines) (3.72 mmoles) in 14 ml H₂O were added to 3.01 g of Jeffamine ED900 (3.34 mmoles). After 10 days, the product was repeatedly washed with MeOH and dried under vacuum at room temperature.

EXAMPLE 8

JAed9/edr (FA 56)

0.47 g of BAC (2.46 mmoles) and 18 mg of Jeffamine EDR 148 (polyoxyalkylenediamines) (0.12 mmoles) in 6 ml H₂O were added to 1.0 g of Jeffamine ED900 (polyoxyalkylenediamines) (1.11 mmoles). After 10 days, the product was repeatedly washed with MeOH and dried under vacuum at room temperature.

EXAMPLE 9

JA'ed9/Das (FA 57)

1.118 g of BAC (7.26 mmoles) and 33.7 g of Jeffamine EDR 148 (polyoxyalkylenediamines) (0.383 mmoles) in 14 ml H₂O were added to 3.10 g of Jeffamine ED900 (polyoxyalkylenediamines) (3.44 mmoles). After 15 days, the product was repeatedly washed with MeOH and then with hexane and dried under vacuum at room temperature.

The obtained hydrogels were subjected to swelling tests both in distilled water, and in saline solution (1% NaCl).

The results are shown in the following Tables:

TABLE 1

Products obtained with Jeffamine C346 (polyoxyalkylenediamines) and BAP in 1:2 ratio and subsequent cross-linking with the compounds shown in the Table:

| Gel (code) | Crosslinking agent (referred to JC346 taken as 1 in moles) | Swelling in H₂O | in NaCl 1% |
|---|---|---|---|
| JAEJ 10% | JD230 (0.2) +EDA (0.8) | 750 | 850 |
| JAJ 25% | JD 200 (0.5) | 690 | 610 |
| JAEJ 5% | JD230 (0.1) +EDA (0.4) | 600 | 690 |
| JAed6-25% | JED 600 (0.5) | 970 | 1130 |
| JAed9-25% | JED 900 (0.5) | 780 | 730 |
| JAed9 bis (FA 51) (25% H₂O) | JED 900 (0.5) | 1650 | 1340 |

Note:
The reaction between Jeffamine C346 (polyoxyalkylenediamines) and BAP occurs in 60% w/w aqueous solution for 2 days at room temperature. The cross-linking then occurs by addition of the crosslinking agent/s, according to a Michael's type addition mechanism.

TABLE 2

Products obtained with Jeffamine C346 (polyoxyalkylenediamines) and BAP in 1:1,1 ratio, crosslinking with ethylenediamine (EDA)

| Gel (code) | Crosslinking agent (referred to JC346 taken as 1 in moles) | Swelling in H₂O | in NaCl 1% |
|---|---|---|---|
| JBE 5% | EDA 0.05 | 1860 | 1320 |
| JBE bis (FA 52) | EDA 0.05 | 2220 | 2380 |

Note:
For the product JBE 5% the addition of the crosslinking agent occurs in subsequent times. The product FA 52 (JBE 5% bis) has been obtained by contemporaneously mixing reagents and crosslinking agents.

TABLE 3

Products obtained with Jeffaimine C346 (polyoxyalkylened-
iamines) and BAC in 1:2 ratio and subsequent cross-linking with
the compounds shown in the Table:

| Gel (code) | Crosslinking agent (referred to JC346) taken in 1 in moles) | Swelling in H$_2$O | in NaCl 1% |
|---|---|---|---|
| JA'EJ 10% | JD230 (0.2) +EDA (0.8) | 1860 | 1320 |
| JA'EJ 5% | JD230 (0.1) +EDA (0.4) | 605 | 690 |
| JAed6 bis (FA 47) (H$_2$O) | JED 600 (0.5) | 480 | 680 |
| JAed9 bis (FA 62) (H$_2$O) | JED 900 (0.5) | 690 | 830 |

Note:
The products FA 47 (JA'Jed6 bis) and e FA'Jed9 bis were obtained by contemporaneously mixing reagents and crosslinking agents.

We claim:

1. Polyetheramidoamine hydrogels consisting of polyetheramidoamine and/or polyamidoamine, prepolymers containing an activated double bond which is susceptible to the Michael's nucleophilic polyaddition, crosslinked with alpha-omega-diamino monomers or oligomers, with the proviso that at least one of the prepolymer or of the alpha-omega-diamino monomers or oligomers contains a polyether alkylene chain.

2. Hydrogels according to claim 1, wherein the prepolymers have the formulae:

$$\{[AA][BB]\}_x$$

or $$\{[AA][B]\}_x\{[AA][BB]\}_y$$

wherein x and y are numbers 1 to 50, wherein:

[AA] is a compound of formula (I):

$$CH_2=CH-\underset{\underset{O}{\|}}{C}-\underset{\underset{R_1}{|}}{N'}-[D]-\underset{\underset{R_1}{|}}{N''}-\underset{\underset{O}{\|}}{C}-CH=CH_2 \quad (I)$$

wherein:

R$_1$ is hydrogen:

is C$_1$–C$_{12}$ straight or branched alkylene unsubstituted or substituted with one or more hydroxy groups, optionally interrupted by oxygen atoms, or together with N' and N'', forms a piperazine ring, in which case R$_1$ is absent;

[BB] is a compound of formula (II):

$$HN-[E]-NH \atop {\ \ |\ \ \ \ \ \ \ \ \ \ |} \atop {R_2 \ \ \ \ \ \ \ R_2} \quad (II)$$

wherein:

R$_2$ is C$_1$–C$_{10}$ straight or branched alkyl, optionally substituted with one or more hydroxy groups;

[E] is C$_1$–C$_{12}$ straight or branched alkylene unsubstituted or substituted with one or more hydroxy groups, optionally interrupted by oxygen atoms;

[B] is a compound of formula (IIa):

$$H_2N-[F]-H \quad (IIa)$$

wherein [F] has the same meanings as [E] and it can also be interrupted by tertiary amino groups.

3. Hydrogels according to claim 2, wherein [D] is a group of formula (III):

$$-(CH)_a-(CH_2)_b-(OCH-CH)_c-(CH_2)_d-(O-CH-CH)_e-(OCH-CH)_f \atop {\ \ |\ \ \ \ \ \ \ \ \ \ \ \ \ \ \ \ \ \ \ \ \ \ \ \ \ |\ \ \ \ \ |\ \ \ \ \ \ \ \ \ \ \ \ \ \ \ \ \ \ \ \ \ |\ \ \ \ |\ \ \ \ \ \ \ \ \ \ \ |\ \ \ \ |} \atop {R_3 \ \ \ \ \ \ \ \ \ \ \ \ \ \ \ \ \ \ \ \ \ \ \ \ \ R_4 \ \ R_5 \ \ \ \ \ \ \ \ \ \ \ \ \ \ \ R_6 \ R_7 \ \ \ \ \ \ R_8 \ R_9} \quad (III)$$

wherein a, b, c, d, e and f are numbers 0 to 12, R$_3$ is methyl, hydroxy, C$_1$–C$_{12}$ alkyl, optionally substituted with one or more hydroxy groups;

R$_4$–R$_9$ are independently hydrogen or methyl.

4. Hydrogels according to claim 2, wherein bisacrylamides [AA] are selected from the group consisting of bisacryloylpiperazine, methylene-bis-acrylamide, dihydroxyethylenebisacrylamide, bisacrylamides wherein the group [D], together with the nitrogen atoms N' and N'', form polyoxyalkylenediamines.

5. Hydrogels according to claim 2, wherein compound [BB] of the formula:

$$HN-CH-CH_2-[OCH_2-CH]_{2.6}NH \atop {\ \ \ |\ \ \ \ \ |\ \ \ \ \ \ \ \ \ \ \ \ \ \ \ \ \ \ \ \ \ \ \ \ \ \ \ \ \ |\ \ \ \ \ |} \atop {\ \ CH_2\ \ CH_3\ \ \ \ \ \ \ \ \ \ \ \ \ \ \ \ \ \ \ \ \ \ \ \ CH_3\ \ CH_2} \atop {\ \ \ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |} \atop {CH_3-CH\ \ \ \ \ \ \ \ \ \ \ \ \ \ \ \ \ \ \ \ \ \ \ \ \ \ \ \ \ \ \ \ CH-CH_3} \atop {\ \ \ |\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |} \atop {\ \ OH\ \ \ \ \ \ \ \ \ \ \ \ \ \ \ \ \ \ \ \ \ \ \ \ \ \ \ \ \ \ \ \ \ \ \ \ \ \ \ OH}$$

6. Hydrogels according to claim 1 wherein the prepolymers are crosslinked with compounds of formula (IV):

$$H_2N-[G]-NH_2 \quad (IV)$$

wherein:

[G] is C$_2$–C$_{12}$ straight or branched alkylene, unsubstituted or substituted with one or more hydroxy groups, optionally interrupted by oxygen atoms and/or NR$_{10}$ amino groups, wherein R$_{10}$ is hydrogen or C$_1$–C$_4$ alkyl.

7. Hydrogels according to claim 1 wherein the prepolymers are cross-linked with compounds of the formula H$_2$N—[G]—NH$_2$ wherein [G] represents polyoxyalkylene residues.

8. A process for the preparation of the hydrogels of claim 2 which comprises crosslinking the prepolymers of said formula $\{[AA][BB]\}_x$ or $\{[AA][B]\}_x\{[AA][BB]\}_y$ with crosslinking agents of formula (IV)

$$H_2N-[G]-NH_2 \quad (IV)$$

wherein [G] is $C_2$–$C_{12}$ straight or branched alkylene, unsubstituted or substituted with one or more hydroxy groups, optionally interrupted by oxygen atoms and/or $NR_{10}$ amino groups, wherein $R_{10}$ is hydrogen or $C_1$–$C_4$ alkyl through a nucleophilic polyaddition mechanism, in a polar solvent, at a temperature from 20° to 40° C., shielded from light.

9. A superabsorbing material having as the absorbing ingredient the hydrogels of claim 1.

* * * * *